(12) United States Patent
Heidari et al.

(10) Patent No.: US 6,516,049 B1
(45) Date of Patent: Feb. 4, 2003

(54) METHOD AND APPARATUS FOR INSERTION LOSS ESTIMATION IN WIRELINE COMMUNICATIONS

(75) Inventors: Sam Heidari, Menlo Park, CA (US); Behrooz Rezvani, San Ramon, CA (US); Hojat Khelghati, San Jose, CA (US); Yuwen Su, Cupertino, CA (US); Qasem Aldrubi, Fremont, CA (US)

(73) Assignee: Ikanos Communications, Inc., Fremont, CA (US)

( * ) Notice: Subject to any disclaimer, the term of this patent is extended or adjusted under 35 U.S.C. 154(b) by 0 days.

(21) Appl. No.: 09/876,195

(22) Filed: Jun. 6, 2001

Related U.S. Application Data
(60) Provisional application No. 60/209,943, filed on Jun. 6, 2000, and provisional application No. 60/261,715, filed on Jan. 13, 2001.

(51) Int. Cl.[7] ............... H04M 1/24; H04M 3/08; H04M 3/22; G01R 31/03
(52) U.S. Cl. ............. 379/1.01; 379/1.03; 379/22; 379/27.01; 379/28; 379/30; 370/248; 324/520
(58) Field of Search ................ 379/1.01, 1.03, 379/1.04, 22, 22.02, 22.04, 24, 27.01, 27.03, 28, 29.01, 30, 31, 32.02, 32.04; 370/241, 248, 252; 324/520, 527, 532, 533, 534, 535, 543

(56) References Cited

U.S. PATENT DOCUMENTS

| | | | | |
|---|---|---|---|---|
| 6,058,162 A | * | 5/2000 | Nelson et al. | 379/27 |
| 6,115,466 A | * | 9/2000 | Bella | 379/399 |
| 6,137,880 A | * | 10/2000 | Bella | 379/399 |
| 6,144,735 A | * | 11/2000 | Bella | 379/399 |
| 6,177,801 B1 | * | 1/2001 | Chong | 324/520 |
| 6,205,220 B1 | * | 3/2001 | Jacobsen et al. | 379/417 |
| 6,263,048 B1 | * | 7/2001 | Nelson et al. | 379/27 |
| 6,417,672 B1 | * | 7/2002 | Chong | 324/520 |

* cited by examiner

Primary Examiner—Binh Tieu
(74) Attorney, Agent, or Firm—IP Creators; Charles C. Cary

(57) ABSTRACT

The current invention provides a method and apparatus for determining insertion loss in wireline communication systems. The method may be implemented with any modulation protocol but is particularly suited for multi-carrier modulation protocols such as discrete multi-tone (DMT). The method for calculation of the insertion loss uses a received signal and a discrete subset of frequency ranges, e.g. DMT tones, within that signal. For each of the subset of frequency ranges the average received power on each of the selected set of tones is determined. Next the average power on each received subset of tones is converted to $\log_2$ using a simple $\log_2$ estimation circuit that avoids the complexity associated with log tables and other prior art methods of computing logarithms. Then the sum of the $\log_2$ of the average power received in each of the selected subset of tone bins is determined. Next, the known transmitted power for the selected subset of tones is expressed as $\log_2$, is summed and is then subtracted from the sum of the $\log_2$ of the average power received. Then using a simple electrical length estimation circuit the insertion loss is calculated. A corresponding apparatus is disclosed.

1 Claim, 3 Drawing Sheets

METHOD AND APPARATUS FOR INSERTION LOSS ESTIMATION IN WIRELINE COMMUNICATIONS

CROSS REFERENCE TO RELATED APPLICATION

This application claims the benefit of prior filed co-pending Provisional Applications No. 60/209,943 filed on Jun. 6, 2000 entitled "Frequency Dependent Power Backoff"; and No. 60/261,715 filed on Jan. 13, 2001 entitled "Upstream Power Backoff for VDSL" which are incorporated herein by reference in their entirety as if fully set forth herein.

BACKGROUND OF THE INVENTION

1. Field of Invention

The field of the present invention relates in general to modems and more particularly digital modems.

2. Description of the Related Art

Digital Subscriber Lines (DSL) technology and improvements thereon including: G.Lite, ADSL, VDSL, HDSL all of which are broadly identified as X-DSL have been developed to increase the effective bandwidth of existing subscriber line connections to high speed back bone networks developed by telecommunications companies. An X-DSL modem operates at frequencies higher than the voice band frequencies, thus an X-DSL modem may operate simultaneously with a voice band modem or a telephone conversation. Currently there are over ten discrete XDSL standards, including: G.Lite, ADSL, VDSL, SDSL, MDSL, RADSL, HDSL, etc. Within each standard there are at least two possible line codes, or modulation protocols, discrete multi-tone (DMT) and carrier less AM/PM (CAP).

Each new XDSL protocol raises the bandwidth requirements of subscriber lines. As the bandwidth requirements increase so too does the complexity of the modem components. Additionally, because of the enormous variation in loop loss in the individual subscriber lines to which the modem may be coupled the individual components of the modem transmit and receive path must be reconfigurable to match the available bandwidth on a selected subscriber line. For modems which implement the VDSL protocol for example, the length and quality of the subscriber line will determine whether all or a portion of the two upstream and two downstream communications ranges will be available. The sheer length of the line results in significant attenuation of the upper communication ranges rendering their use impractical. Even on shorter loops the presence of bridges and taps can also constrain bandwidth. In each instance it is critical during the line qualification phase to be able to inexpensively and quickly determine insertion power loss into the subscriber line to which the modem is coupled.

What is needed is a modem with improved capabilities for determining insertion loss into a subscriber line.

SUMMARY OF THE INVENTION

The current invention provides a method and apparatus for determining insertion loss in wireline communication systems. The method may be implemented with any modulation protocol but is particularly suited for multi-carrier modulation protocols such as discrete multi-tone (DMT).

The method for calculation of the insertion loss uses a received signal and a discrete subset of frequency ranges, e.g. DMT tones, within that signal. For each of the subset of frequency ranges the average received power on each of the selected set of tones is determined. Next the average power on each received subset of tones is converted to $\log_2$ using a simple $\log_2$ estimation circuit that avoids the complexity associated with log tables and other prior art methods of computing logarithms. Then the sum of the $\log_2$ of the average power received in each of the selected subset of tone bins is determined. Next, the known transmitted power for the selected subset of tones is expressed as $\log_2$, is summed and is then subtracted from the sum of the $\log_2$ of the average power received. Then using a simple electrical length estimation circuit the insertion loss is calculated. A corresponding apparatus is disclosed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

Figure 1:
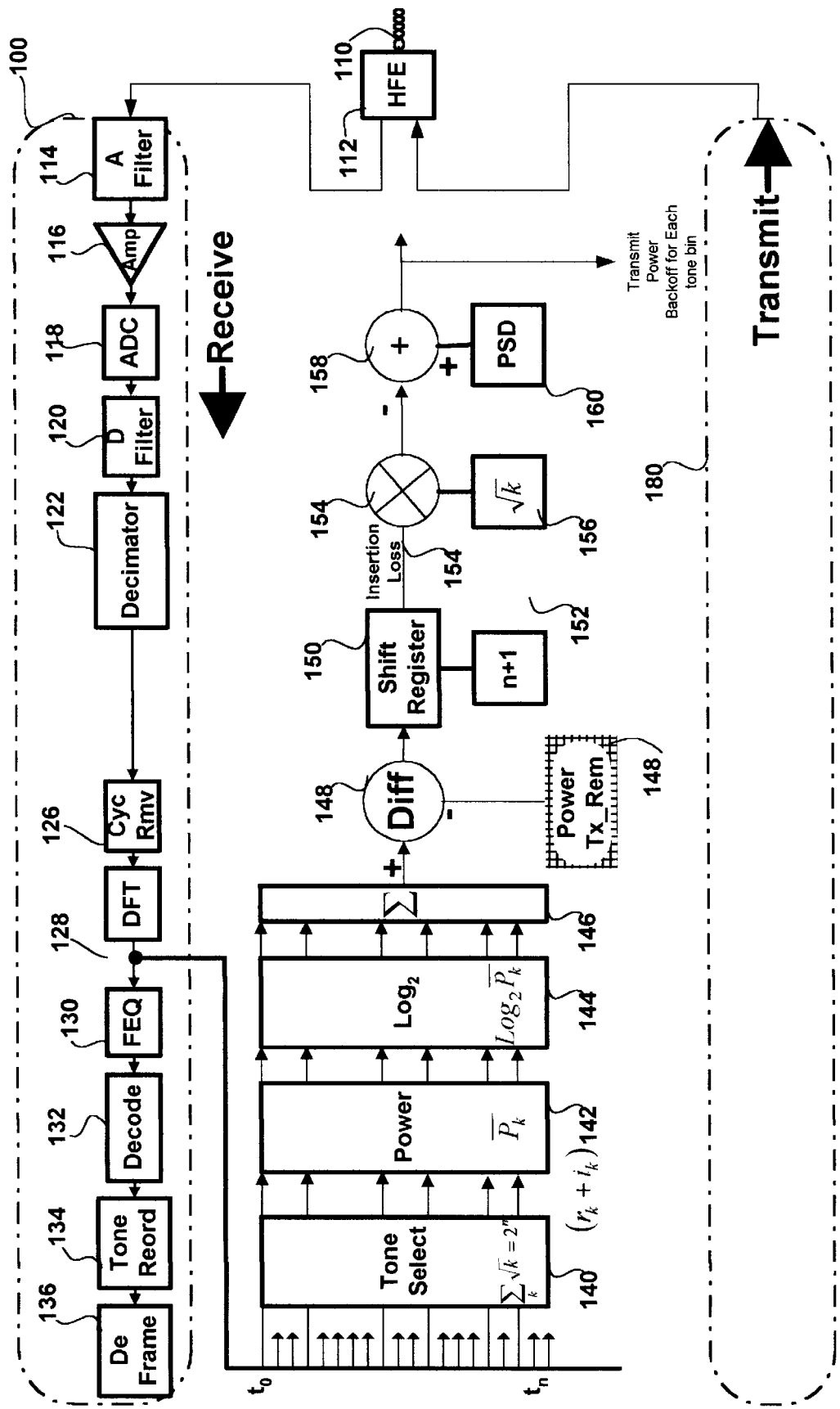
FIG. 1 is a hardware block diagram showing a receive path of an DSL modem incorporating components for determining the insertion line loss.

FIG. 1 is a hardware block diagram showing a receive path of an XDSL modem incorporating insertion loss estimation circuitry. The circuit includes a hybrid front end (HFE) 112 which couples the receive path 180 and transmit paths to subscriber line 110. The receive path includes analog filter 114, line amplifier 116, analog to digital converter (ADC) 118, digital filter 120, decimator 122, cyclic prefix remover 126, discrete Fourier transform engine (DFT) 128, the frequency domain equalizer 130, the decoder 132, the tone reorderer 134 and the deframer 136.

The components for estimating insertion loss are shown coupled to the output of the DFT 128. The first of these components is the tone selector 140 which selects a discrete subset of the frequencies, e.g. tones for processing. Those tones obey the relationship where the sum of the square root of the index of each tone equals an integer power of two. Selecting the subsets with these indices greatly simplifies the calcuation of insertion loss, next in power module 142 each of the complex coefficients for each of the selected subset of frequencies is utilized successively to determine the average power in each tone bin. Then in module 144 the $\log_2$ of the average power for each tone bin. The estimator determines the most significant bit location "i" in the average power result for each tone bin. If the adjacent least significant bit equals "1" then the log estimate for the average power of that tone bin equals i+1 else i. Next in summer 146 the sum of the logs of the average power for all the selected subset of tone bins is computed. Then in differencer 148 the $\log_2$ of the transmit power is subtracted and the result is passed to shift register 150. The shift register shifts the result n+1 places equivalent to dividing in the real number domain by the number of samples in the selected subset. The result at signal line 154 is the $\log_2$ insertion loss.

Where power backoff is to be computed the insertion loss may be utilized by multiplying for each transmit tone bin the square root of k the tone index times the $\log_2$ insertion loss output.

The hardware blocks shown in this and the following figures may be alternately implemented in software or firmware. The receive path described above and the scalable components thereof may be applied with equal advantage to where a plurality of XDSL channels are multiplexed on a common receive path. The receive path components may be coupled to one another either by packet based transfer of successive packetized portions of a communication channel or by dedicated point-to-point coupling between components.

The received power $P_{Rx}$ is a function of the transmitted power $P_{Tx}$ and the insertion loss in the line is expressed in Equation 1.

$$Loss(f) = \frac{P_{Rx(f)}}{P_{Tx(f)}} = |e^{-d\alpha\sqrt{f}}|^2 \qquad \text{Equation 1:}$$

Where d is the distance between transmitter and receiver, f is the frequency of observation, and is a constant that is a function of type of wire used. The type of the wire for most applications is not known a prior; however, distance d can be measured assuming a reference wire type (such as 24 AWG). Here, this distance is referred to as equivalent electrical distance of the line, which is an indication of the loss in the line. Furthermore, assuming that measurements are done on equally spaced grids in frequency domain, the frequency f can be expressed as f=k×Δf. By expressing the electrical distance d as $\hat{d}=d\alpha\sqrt{\Delta f}$ equation 1 can be simplified into Equation 2.

$$Loss(k) = \frac{P_{Rx(k)}}{P_{Tx(k)}} = |e^{-\hat{d}\sqrt{k}}|^2 \leftarrow \text{New Equation} \qquad \text{Equation 2:}$$

where k is the tone index and $\hat{d}$ is the electrical length estimator.

By estimating the value of $\hat{d}$ the insertion loss of the line can be characterized. In some applications such as up stream power back off (UPBO) as prescribed by the VDSL standards, this value can be directly used to estimated the insertion loss in the opposite directions, however, in other applications such as line qualification, $\hat{d}$ must be processed via some intermediate steps such as a lookup table.

The received power $P_{Rx(k)}$ for one tone bin k is expressed in the following Equation 3.

$$P_{Rx(k)} = |e^{-\hat{d}\sqrt{k}}|^2 P_{Tx}(k) \leftarrow \text{New Equation} \qquad \text{Equation 3:}$$

The tone indexes k are chosen in a manner which simplifies the electrical line length estimator $\hat{d}$. Tone indexes are selected which are distributed across the bandwidth of interest with the additional qualification that the sum of the square roots of the selected tone indexes may be expressed as an integer power of 2 as set forth in the following Equation 4;

$$\text{Tone Indexes}(k) \equiv \sum_{i=0}^{M} \sqrt{k_i} = 2^n \leftarrow \text{New Equation} \qquad \text{Equation 4:}$$

where $k_i$ is index of the $i^{th}$ tone used by the apparatus and there are a total of M tones used. A qualifying set of tones for a frequency space covered by 128 tones right be: k=4,9,16,25,64,100. Each tone bin has integer square root values: 2,3,4,5,8,10 respectively, a sum of 32 which corresponds with $2^5$ or n=5. As shown later, this property will enable a simpler hardware block to replace a cumbersome division operation.

Once the qualifying tones have been selected their instantaneous (or average power) for each tone bin is computed as expressed in the following Equation 5.

$$P_{Rx(k)} = r_k^2 + i_k^2 \qquad \text{Equation 5:}$$

where r and i are the real and imaginary parts of the amplitude of the received signal within each of the tone bins "k" of the set of K tone bins.

Next we take the $\log_2$ of the instantaneous or more accurately the average received power for each tone bin, as expressed in the following Equation 6.

$$\log_2(P_{Rx(k)}) - \log 2(P_{Tx(k)}) = 2(\log_2 e)(-\hat{d}\sqrt{k}) \qquad \text{Equation 6}$$

and the results are summed for all K tone bins to yield the log of the instantaneous or average received power for all of the k sampled tone bins. The purpose of this step is to mitigate the effect of noise and bridge tabs in the estimation process. The sum is effectively equivalent to averaging operation across measured frequency bins. The following Equation 7 expresses this result for the set of tones discussed above with indexes k=4,9,16,25,64,100.

$$\log_2(P_{Rx(4)}) - \log_2(P_{Tx(4)}) = 2(\log_2 e)(-\hat{d}\sqrt{4}) \qquad \text{Equation 7:}$$
$$\log_2(P_{Rx(9)}) - \log_2(P_{Tx(9)}) = 2(\log_2 e)(-\hat{d}\sqrt{9})$$
$$\log_2(P_{Rx(16)}) - \log_2(P_{Tx(16)}) = 2(\log_2 e)(-\hat{d}\sqrt{16})$$
$$\log_2(P_{Rx(25)}) - \log_2(P_{Tx(25)}) = 2(\log_2 e)(-\hat{d}\sqrt{25})$$
$$\log_2(P_{Rx(64)}) - \log_2(P_{Tx(64)}) = 2(\log_2 e)(-\hat{d}\sqrt{64})$$
$$\underline{\log_2(P_{Rx(100)}) - \log_2(P_{Tx(100)}) = 2(\log_2 e)(-\hat{d}\sqrt{100})}$$
$$\sum_{i=0}^{M} \log_2(P_{Rx(k_i)}) - \underbrace{\sum_{i=0}^{M} \log_2(P_{Tx(k_i)})}_{\text{known a prior}} =$$
$$-2(\log_2 e)(32)\hat{d}$$

In the log domain the insertion loss is expressed in terms of transmit and received power as shown in the following Equation 7. Since the transmit power is known by communication between the remote and the local sites or has been defined a prior, Equation 8 is log based 2 of loss easily estimated.

$$\log_2(\text{Loss}) = \log_2(P_{Rx(k)}) - \log_2(P_{Tx(k)}) = 2(\log_2(e))(-\hat{d}\sqrt{k})$$
$$-\log_2(P_{Tx(k)}) \qquad \text{Equation 8:}$$

Using Equation 8, the electrical distance "d" can be estimated, however, in order to reduce the inaccuracies due to measurement and line noise, an averaged version of Equation 8 as shown in Equation 9 is used.

$$\sum_{i=0}^{M} 2(\log_2(e))(-\hat{d}\sqrt{k_i}) = \qquad \text{Equation 9:}$$

$$\sum_{i=0}^{M} \log_2(P_{Rx(k_i)}) - \sum_{i=0}^{M} \log_2(P_{Tx(k_i)})$$

Equation 10 shows the final stage of estimating $-\hat{d}\log_2 e$. As shown, this operation requires a division operation, which is very costly both in Hardware as well as Software implementations.

$$-\hat{d}\log_2 e = \frac{\sum_{i=0}^{M-1} \log_2(P_{Rx(k_i)}) - \sum_{i=0}^{M-1} \log_2(P_{Tx(k_i)})}{2^{n+1}} \quad \text{Equation 10:}$$

The division is easily avoided and replace with a shift right operation by n+1 since the denominator is 2 to the power of n+1.

For UBPO applications, the estimated value $-\hat{d}\log_2 e$ is used to determined the scaling coefficients of the Tx power in the opposite direction where Tx power for tone k is given as expressed in the following Equation 11:

$$\log_2(P_{Tx(k)}) = \underbrace{\log_2(PSDR_{Rx(k)})}_{\text{Known or Calculated from Received Info}} \overset{=-2\hat{d}\log_2 e\sqrt{k}}{-\log_2(Loss(k))} \text{ where the} \quad \text{Equation 11:}$$

$PSDRR_{Rx(k)}$ is the desired power spectral density at the receiver of the opposite side for tone k and the loss(k). The Amplitude required to achieve the transmit power is defined by the square roots of the power, however, the square root in the log domain is equivalent to division by two operation, therefore the log base 2 of the required amplitude is defined as set forth in the following Equation 12:

$$\log_2(A_{Tx(k)}) = \frac{1}{2}\log_2(PSDR_{Rx(k)}) - \hat{d}\log_2 e\sqrt{k} \quad \text{Equation 12:}$$

after the estimation of log base 2 of ($A_{TX(k)}$), the proper gains can be easily applied to the tones in the transmit direction.

For other applications, such as line qualification, the corresponding information such as the distance or possible throughputs can be extracted from estimated, $-\hat{d}\log_2 e$, via a lookup table or similar apparatus.

The method described above can be easily extended to more complicated of the insertion loss of the line such as shown in the following Equation 13:

$$\text{Loss } (F) = |e^{-d(\alpha\sqrt{f}+\epsilon f)}|^2 \quad \text{Equation 13:}$$

where ε is another constant determined by the wire type.

Figure 2:
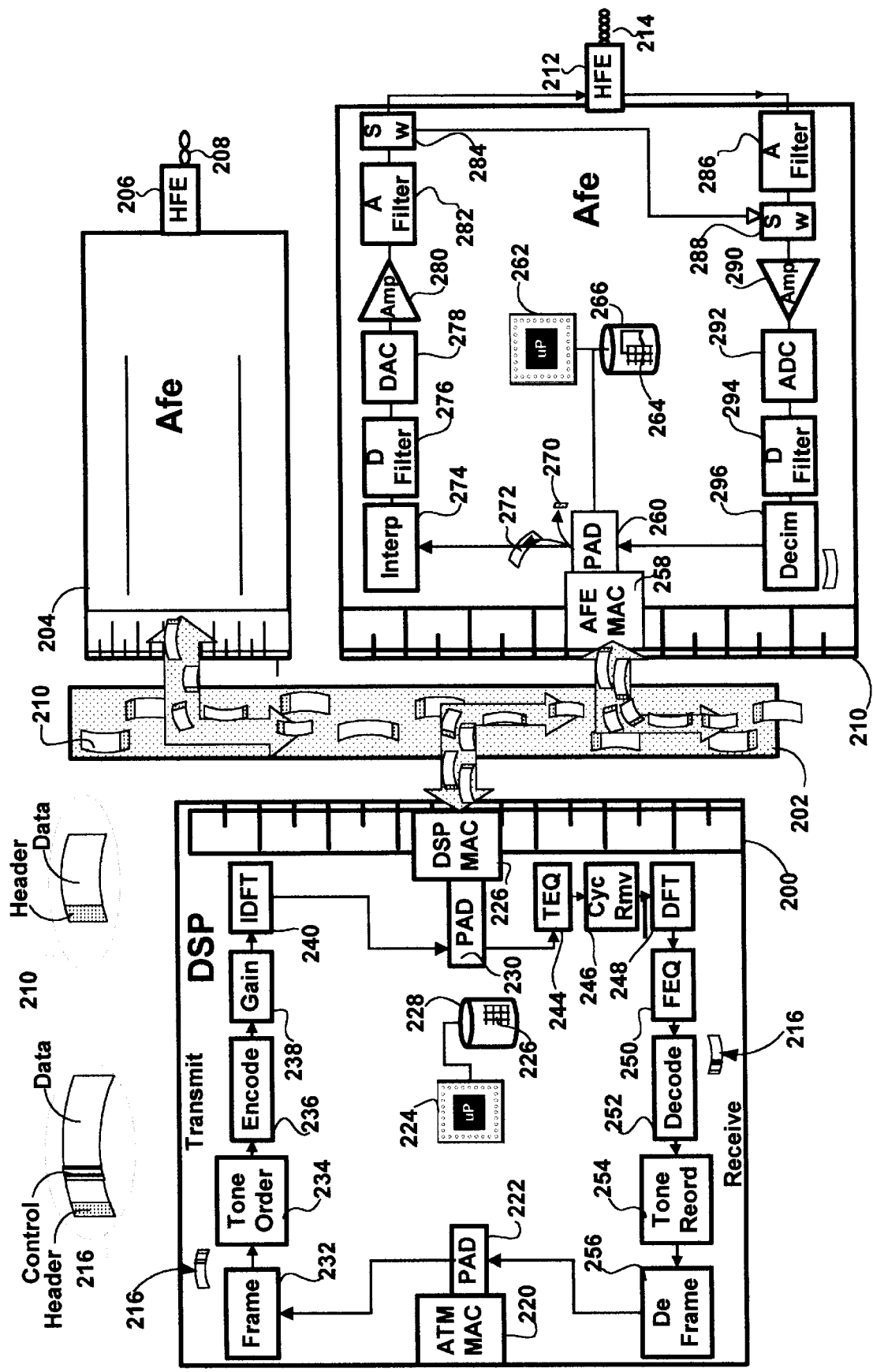
FIG. 2 is a detailed hardware block diagram of a packet based multi-channel multi-protocol XDSL logical modem which may be used to implement the current invention.

FIG. 2 is a detailed hardware block diagram of a packet based multi-channel multi-protocol XDSL logical modem which may be used to implement the current invention.

FIG. 2 is a detailed hardware block diagram of a packet based multi-channel multi-protocol XDSL logical modem which may be used to implement the current invention. In this architecture a DSP 200 handles processing for a number of channels of upstream and downstream subscriber line communications via a number of analog front ends (AFE's) 204 and 210. Each AFE in turn accepts packets associated with one or more of subscriber lines to which each AFE is coupled. AFE 204 is shown coupled via HFE 206 with subscriber line 208. AFE 210 is shown coupled via HFE 212 with subscriber line 214. The logical modem shown in FIG. 2 supports packet based processing of data between a DSP and AFE as well as within each DSP and AFE. Packet processing between DSP and AFE modules involves transfer over bus 202 of bus packets 210 each with a header and data portion. The header contains information correlating the data with a specific channel and direction, e.g. upstream or downstream, of communication. The data portion contains for upstream traffic digitized samples of the received data for each channel and for downstream packets digitized symbols for the data to be transmitted on each channel.

Packet processing within a DSP may involve device packets 216. The device packets may include a header, a control portion and a data portion. The header serves to identify the specific channel and direction. The header may contain control information for the channel to be processed. The control portion may also contain control parameters for each specific component along the transmit or receive path to coordinate the processing of the packets. Within the AFE the digitized data generated for the received (upstream data) will be packetized and transmitted to the DSP. For downstream data, the AFE will receive in each packet from the DSP the digitized symbols for each channel which will be modulated in the AFE and transmitted over the corresponding subscriber line. These modules, AFE and DSP, may be found on a single universal line card, such as line card 116 in FIG. 1. They may alternately be displaced from one another on separate line cards linked by a DSP bus. In still another embodiment they may be found displaced across an ATM network.

The DSP 200 includes, a DSP medium access control (MAC) 226 which handles packet transfers to and from the DSP bus 202. The MAC couples with a packet assembler/disassembler (PAD) 232. For received DSP bus packets, the PAD handles removal of the DSP bus packet header and insertion of the device header and control header which is part of the device packet 216. The content of these headers is generated by the core processor 224 using statistics gathered by the de-framer 256. These statistics may include gain tables, or embedded operations channel communications from the subscriber side. The PAD embeds the required commands generated by the core processor in the header or control portions of the device packet header. Upstream device packets (Receive packets) labeled with the appropriate channel identifier are passed through the time domain equalizer (TEQ) 244 and the cyclic prefix/suffix remover 246 to the discrete Fourier transform engine 248. The DMT engine fetches packets and processes the data in them in a manner appropriate for the protocol, channel and command instructions, if any, indicated by the header. The processed data is then passed to the frequency domain equalizer (FEQ) 250, the decoder 252, the tone reorderer 254 and the deframer 256. Each module reads the next device packet and processes the data in it in accordance with the instructions or parameters in its header. The processed de-framed data is passed to the ATM pad 222 for wrapping with an ATM header and removal of the device header. The ATM MAC 220 then places the data with an ATM packet on the ATM network.

Control of the receive modules, e.g. DFT engine 248, FEQ 250, etc. is implemented as follows. The core processor 224 gathers statistical information on each channel including gain tables, or gain table change requests from the subscriber as well as instructions in the embedded operations portion of the channel. Those tables 226 are stored by the core processor in memory 228. When a change in gain table for a particular channel is called for the core processor sends instructions regarding the change in the header of the device packet for that channel via PAD 230 and writes the new gain table to a memory which can be accessed by the appropriate module in the receive path. This technique of in band signaling with packet headers allows independent scheduling of actions on a channel by channel basis in a manner which does not require the direct control of the core processor. Instead each module in the receive path can execute independently of the other at the appropriate time whatever actions are required of it as dictated by the information in the device header which it reads and executes.

This device architecture allows the DSP transmit and receive paths to be fabricated as independent modules or sub modules which respond to packet header control information for processing of successive packets with different XDSL protocols, e.g. a packet with ADSL sample data followed by a packet with VDSL sampled data For example as successive packets from channels implementing G.Lite, ADSL and VDSL pass through the DFT 248 the number of tones will vary from G.lite, ADSL and for VDSL. The framer 232 and de-framer 256 will use protocol specific information associated with each of these channels to look for different frame and super frame boundaries. The measured level of each tone is maintained by processor 224 in memory 228. This same memory may be utilized for calculating the inverse channel model for each of the channels to determine the amount of pre-compensation to be applied to downstream data on each of the channels.

On the downstream side (Transmit path) the same architecture applies. ATM data is wrapped by PAD 222 with a device header the contents of which are again dictated by the core processor 224. That processor embeds control information related to each channel in the packets corresponding to that channel. The Framer 232, tone orderer 234, encoder 236, gain scaler 238 and inverse discrete Fourier transform (IDFT) engine 240 process these packets according to the information contained in their header or control portions of each device packet. From the IDFT 240 each updated device packet with a digitized symbol(s) for a corresponding channel is sent to PAD 230 where the device header is removed. The DSP PAD places the DSP packet 210 with an appropriate header to DSP MAC 226 for placement onto the DSP bus 202 for transmission to the appropriate AFE and the appropriate channel and subscriber line within the AFE.

During the calibration phase the core CPU 224 generates a calibration sequence which is injected into the tone bins of the IDFT 240 and passes via packets 210 to the corresponding AFE. During the operational phase a local gain table with pre-compensation factors for each tone bin of the IDFT 240 is maintained in memory 228 and utilized to pre-compensate each tone bin for each downstream channel to equalize the frequency response on the transmit path. Separate pre-compensation tables (i.e. local gain tables) are maintained for each channel.

Because the data flow in the AFE allows a more linear treatment of each channel of information an out of band control process is utilized within the AFE. In contrast to the DSP device packets which are used to coordinate various independent modules within the DSP the AFE accomplishes channel and protocol changeovers with a slightly different control method.

A packet on the bus 202 directed to AFE 210 is detected by AFE MAC 258 on the basis of information contained in the packet header. The packet is passed to PAD 260 which removes the header 270 and sends it to the core processor 262. The packet's header information including channel ID is stored in the core processor's memory 266. The information is contained in a table 264. The raw data 272 is passed to interpolator 274. On the transmit path, the interpolator 274 reads a fixed amount of data from each channel. The amount of data read varies for each channel depending on the bandwidth of the channel. The amount of data read during each bus interval is governed by entries in the control table for each channel which is established during channel setup and is stored in memory 266. The interpolator up samples the data and passes it to low pass filters 276 to reduce the noise introduced by the DSP. Implementing interpolation in the AFE as opposed to the DSP has the advantage of lowering the bandwidth requirements of the DSP bus 202. From the interpolator data is passed to the digital-to-analog converter (DAC) 278. The DAC converts the digitized symbol for each of the input signals on each of the input signal lines/channels to corresponding analog signals. These analog signals are introduced to the amplification stage 280, from which they are passed to analog filter 282 and then via an associated HFE, e.g. HFE 212 to a corresponding subscriber line e.g. subscriber line 214.

A switch 284 is present in the final stages of the analog portion of the transmit path. That switch during the calibration phase couples the transmit to the receive path thereby providing the feedback for the calibration of the local gain table as discussed above in connection with FIG. 1.

On the upstream path, the receive path, individual subscriber lines couple to the receive path. Subscriber line 214 couples through HFE 212 to the analog filer 286. The analog filter provides input through switch 288 to the corresponding line amplifier 290. During the calibration phase the switch 288 couples the transmit to the receive path for feedback of the calibration signal corresponding with the output on the transmit path. From the line amplifier the received analog data is digitized in the analog to digital converter (ADC) 292. The digitized output is passed through the digital filter 294 and decimator 296 to the pad 260. The PAD wraps the raw data in a DSP header with channel ID and other information which allows the receiving DSP to properly process it. From the PAD it is passed to the AFE MAC 258 for wrapping in a bus packet 210 and delivery to the DSP 200.

During the calibration phase a calibration sequence is injected into the tone bins of the IDFT 240 and modulated onto the transmit path. Feedback of the resultant analog output signal is provided along the receive path via switches 284,288. On the receive path the ADC 292 performs analog conversion, the DFT 248 conducts spectral analysis on each tone bin. The core CPU normalized the spectral components and generates the local gain table with the precompensation coefficients and stores these in memory 228. During the operational phase the gain scaler 238 scales each complex number input to each tone bin of the IDFT 240 by both a pre-compensation scale factor from the local gain table and by a gain scale from the remote gain table received from the subscriber side. These correspond to the local gain table 122 and the remote gain table 124 shown in FIG. 1.

Figure 3:
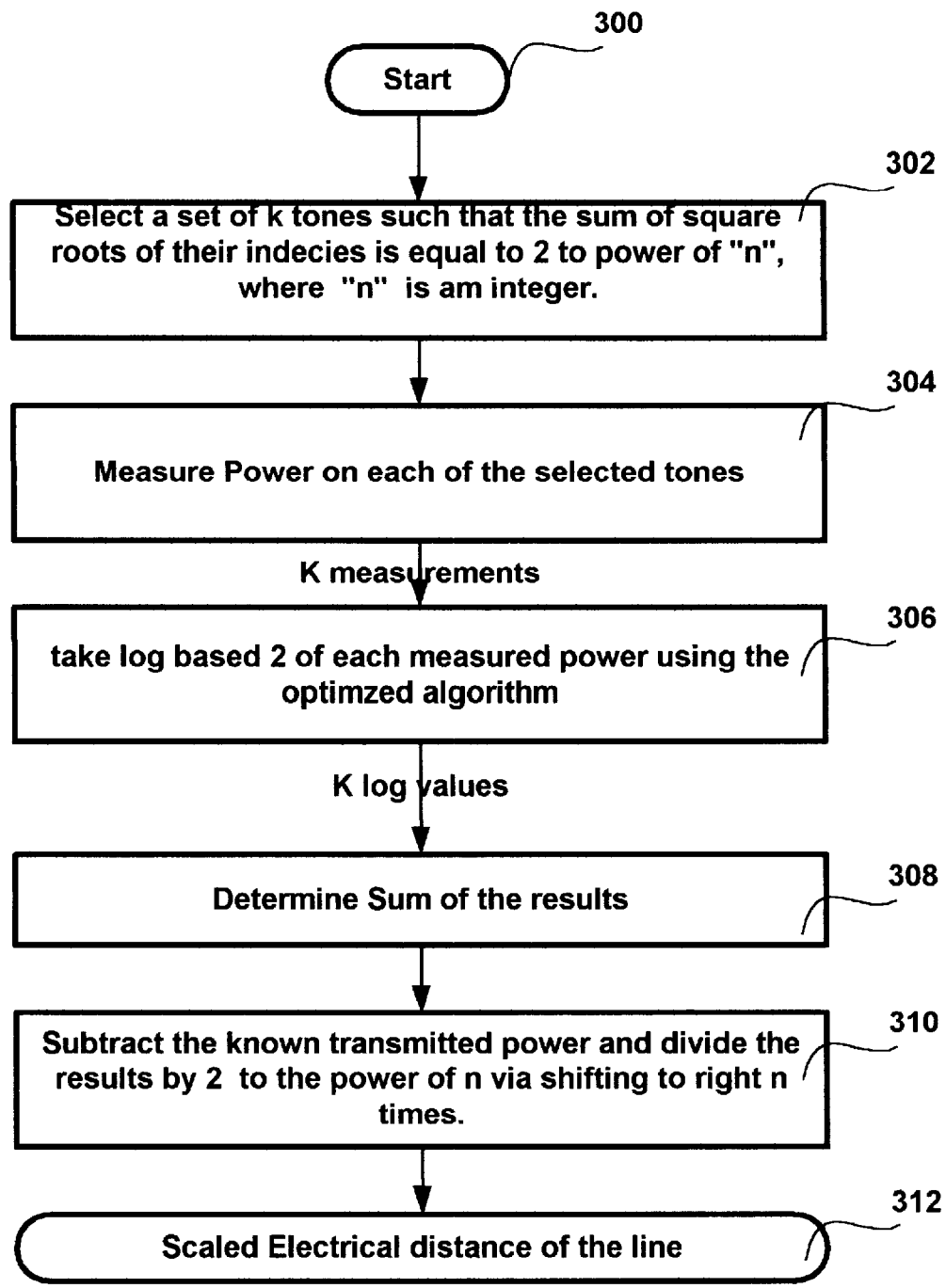
FIG. 3 is a process flow diagram showing the processes associated with determining the insertion line loss.

FIG. 3 is a process flow diagram showing the processes associated with determining the insertion line loss.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for determining insertion loss in a wireline communication comprising:
   a tone selector for selecting a discrete subset set of frequencies within the bandwidth of a received wireline communication;
   a power estimator for determining a sum of a $\log_2$ for each of the selected subset of frequencies;
   an electrical length estimator for determining in $\log_2$ the insertion loss by subtracting from the sum of a $\log_2$ for each of the selected subset of frequencies a corresponding sum of a $\log_2$ for the transmitted power for each of the selected subset of frequencies and converting the resultant to an insertion loss estimate.

* * * * *